United States Patent [19]

Krauser

[11] Patent Number: 4,480,773
[45] Date of Patent: Nov. 6, 1984

[54] HOLDING DEVICE FOR MOTORCYCLES

[75] Inventor: Michael Krauser, Germering, Fed. Rep. of Germany

[73] Assignee: Krauser Kraftfahrzeug-Zubehoer Vertriebs GmbH, Mering, Fed. Rep. of Germany

[21] Appl. No.: 410,821

[22] Filed: Aug. 23, 1982

[30] Foreign Application Priority Data

Mar. 26, 1982 [DE] Fed. Rep. of Germany ....... 3211308

[51] Int. Cl.³ .............................................. B62J 7/04
[52] U.S. Cl. ................................... 224/32 A; 224/39; 211/150
[58] Field of Search ...................... 224/30 R, 31, 32 R, 224/32 A, 39, 282; 248/222.2, 222.3, 223.3, 225.1, 291, 293; 211/99, 149, 150, 195

[56] References Cited

U.S. PATENT DOCUMENTS

| 1,995,980 | 3/1935 | Haymond | 211/99 |
| 4,230,245 | 10/1980 | Pold et al. | 224/32 A |
| 4,269,335 | 5/1981 | LaRose et al. | 224/31 |
| 4,349,138 | 9/1982 | Bruhn | 224/30 R |

FOREIGN PATENT DOCUMENTS 2066751 7/1981 United Kingdom ............. 224/32 A

Primary Examiner—Stephen Marcus
Assistant Examiner—David Voorhees
Attorney, Agent, or Firm—Michael J. Striker

[57] ABSTRACT

A holding device installable on a motorcycle for supporting saddlebags, lateral baggage pouches or luggage pieces is made of a strong, fracture-resistant synthetic material and includes two lateral holding frames which support upper frames interconnected by a transverse luggage rack. The rear part of the lower side of the upper frames has an extension for supporting transverse fastening screws which are guided in grooves formed in the top side of the underlying holding frame. The upper guiding groove permits the tilting of the upper frames downwardly about a quadrant. At the front end of the lower side of the upper frame is formed a locking nose engageable in a corresponding recessed receptacle in a lateral wall of the top side of the holding frame. By displacing and tilting the holding device, it is possible to swing open the seat of the motorcycle to access a storage compartment below the seat.

8 Claims, 6 Drawing Figures 4,480,773

HOLDING DEVICE FOR MOTORCYCLES

BACKGROUND OF THE INVENTION

The present invention relates generally to holding devices for use in connection with motorcycles, and in particular to a holding device for supporting saddlebags, baggage pieces, blinkers, reflectors, and the like. A holding device of this kind, which is produced by pressure casting, is described and illustrated in the German Gebrauchsmuster 7 707 615. This known holding device includes a right-side and a left-side lateral holding member for supporting saddlebags or baggage pouches, two upper frames mounted on the lateral holding members, a transverse baggage rack secured to the upper frames and interconnecting the latter, and an adjustable transverse strutting attached to the lateral holding members. In this known embodiment of a holding device, the baggage rack between the upper frames is rigidly connected to the latter. When this prior-art holding device is installed on a motorcycle having an upwardly swingable seat, as is the case in most types of motorcycles, such prior-art holding device frequently either totally prevents the seat from being swung up or in any case permits only partial lifting of the seat. It is necessary, however, that the seat be readily swingable, inasmuch as tool accessories and in many cases the battery is located therebeneath, and an easy and unobstructed access to these parts must always be preserved. It is a serious drawback of the prior-art holding device that, in order to open up the compartment below the seat, it is necessary to dismantle the baggage rack between the lateral holding parts, which operation is inconvenient, tiresome and time-consuming. As soon as a tool and/or the battery and other parts, such as gloves or the like are again replaced under the seat and the latter is swung down, the baggage rack must again be screwed to the frame parts of the holding device, and this operation is equally troublesome as the dismantling of the rack.

SUMMARY OF THE INVENTION

It is therefore a general object of the present invention to overcome the aforementioned disadvantages.

More particularly, it is an object of the invention to provide an improved baggage holder for a motorcycle which is not possessed of these disadvantages.

An additional object of the invention is to provide such an improved holding device which is strong, fracture-resistant and suitable for installation on motorcycles of different widths.

A further object of the invention is to provide such an improved holding device which permits the upswing of the seat of the motorcycle without the necessity of removing the baggage rack of the holder.

In keeping with these objects, and others which will become apparent hereafter, one feature of the invention resides in the provision of two lateral holding frames each defining a top side and a rear side, two upper frames attached by transversely directed fastening screws to the top side of the holding frames, the frames being made of a strong, fracture-resistant synthetic material, an end part of each top side adjoining the rear side being provided with guiding means for the upper frames, the guiding means extending at least partially in the direction of the top sides so that upon loosening the fastening screws the upper frames are displaceable toward the rear sides and tiltable together with the transverse baggage rack about 90° to abut against the rear sides.

Preferably, the guiding means are in the form of guiding grooves in the top sides of the holding frames.

In order to create a stable, extremely strong holding device, the frames are made of a strong, fracture-resistant synthetic material, such as for example polyamide 6 which is reinforced with 20–33% glass fibers.

According to another feature of this invention, the holding device, namely the lateral saddlebag holding frames, as well as the supporting frames for the baggage racks, are designed such that, when viewed in the direction of movement of the motorcycle, the upper frames for supporting the transverse rack are displaceable rearwardly and together with the baggage rack are tiltable downwardly about the rear edge of the upper side of the holding frames. As a result, the baggage rack is no longer necessary to be dismantled in order to obtain access into the storage compartment beneath the motorcycle seat. For this purpose, the lateral holding frames for saddlebags are provided on their upper sides with guides in which fastening screws of the upper supporting frames, after their loosening, can slide. Preferably, the guiding means are oriented such that the upper frames together with the attached baggage rack are first displaced rearwardly and then the frames are tilted about 90° downwardly.

If the operator of the motorcycle needs to swing up for any reason the motorcycle seat, he needs only to loosen the attachment screws of the upper frames, then displace the same rearwardly and then tilt them together with the attached baggage rack downwardly. In this tilted position, the seat of the motorcycle can be swung up without obstacles, and the operator has free access into the compartment below the seat, storing various accessories such as working tools, batteries, working gloves, and the like. Similarly, when the access into the compartment below the seat is no longer needed and the operator swings the seat back into its normal position, it is necessary only to swing up the baggage rack together with its supporting frames, displace the same forwardly and then tighten the arresting screws. In comparison with conventional holding devices of this type, the upward swing of the seat and thus the accessibility of the compartment underneath is considerably facilitated and is no longer tiresome and time-consuming. While in the prior-art holding devices the entire baggage rack had to be removed, the device according to this invention needs only the loosening of four mounting screws to make the seat compartment accessible.

In order to prevent an unintended and unsafe downward swing of the holding device when for example the operator after manipulation with the holding device and with the motorcycle seat accidentally forgets to tighten again the mounting screw of the holder, or if the mounting screws are tightened up insufficiently, according to the preferred embodiment of this invention an elastically deformable safety member is provided on each holding frame for the saddlebags. After the upswing of the baggage rack and after displacing the upper frames rearwards, the elastically deformable safety member is inserted into a bore formed on an extension of the upper surface of the upper side of the holding frame and the lower side of the upper frame. Due to the elasticity of the safety clip, the latter is reliably held in its arresting position. If luggage is mounted on the rack or inserted into the lateral baggage pouches, the safety clips are additionally held in position and secured against drop-out by the weight of the suspended and attached luggage.

In order to make the baggage holding means according to this invention applicable for a broad variety of types of motorcycles of different widths, according to another preferred embodiment of this invention, the lower side of the baggage rack is provided with a plurality of recesses into which safety nuts are insertable from the outside, so that the clearance between the upper frames of the holding device can be adjusted in the range between 27 cm and 34 cm, for example. By inserting and securing extension plates into the recesses or slots for the safety nuts in the longitudinal sides of the baggage rack, the width or transverse clearance between the lateral and upper frames is adjustable in the range between 34 cm and 41 cm. In other words, by providing the slot-like recesses in the circumferential wall of the baggage rack and by inserting therein safety nuts or extension plates, the width of the holding device according to this invention is adjustable in the total range between 27 cm and 41 cm.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3a is a transverse cross section of the top side of the frame according to FIG. 3, taken along the line A—A;

DESCRIPTION OF THE PREFERRED EMBODIMENTS

Figure 1:
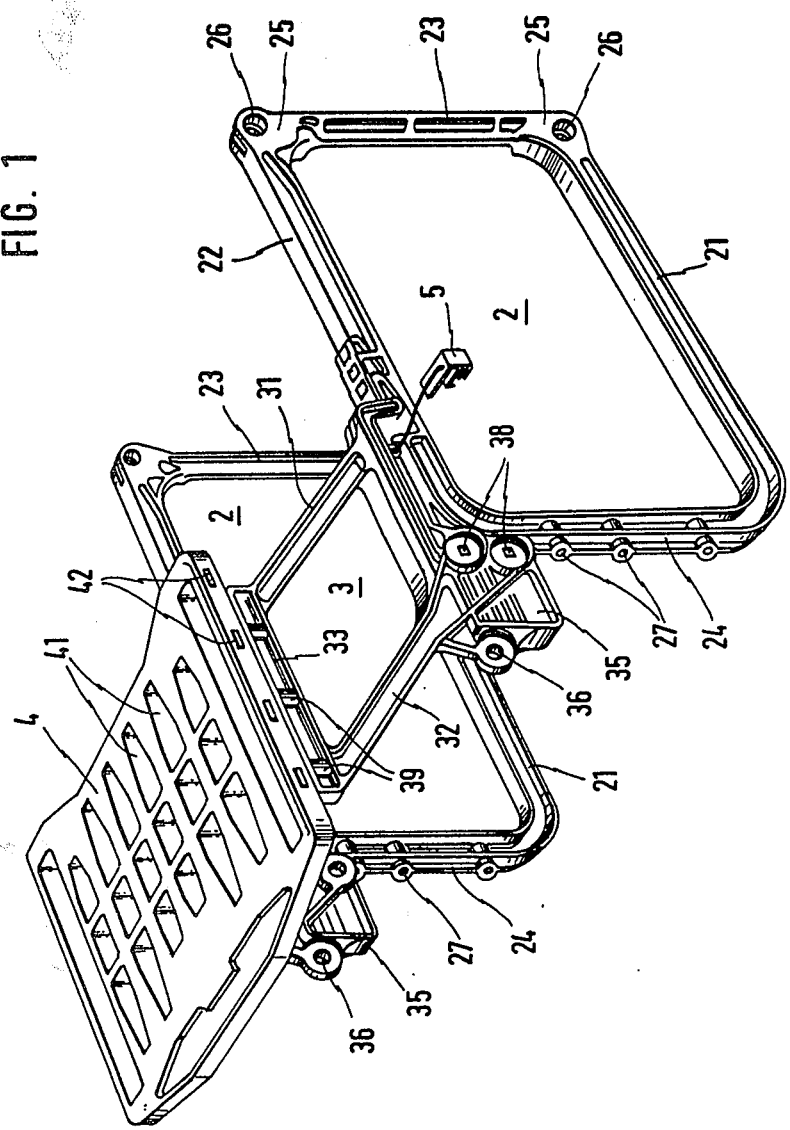
FIG. 1 is a perspective view of an assembled holding device according to this invention.

In the Figures, like component parts are indicated with the same reference numerals, whereby for the sake of clarity the parts not necessary for making and using this invention have been omitted.

Referring now to FIGS. 1-5, the holding device 1 includes two lateral holding frames 2 for supporting lateral saddlebags or baggage pouches. Top side 22 of each lateral frame supports an upper frame 3 which in turn support a transverse baggage rack 4 connected to the upper sides of the upper frames. A non-illustrated transverse strutting which is adjustable in its width to match different types of motorcycles is secured by fastening screws to bores 27 in the rear side 24 of each lateral holding frame 2. The same fastening screws may hold in position non-illustrated holding tongues which are insertable into the lock of a trunk which may be suspended on the lateral frames 2, thus holding and securing the trunk in position.

Figure 2:
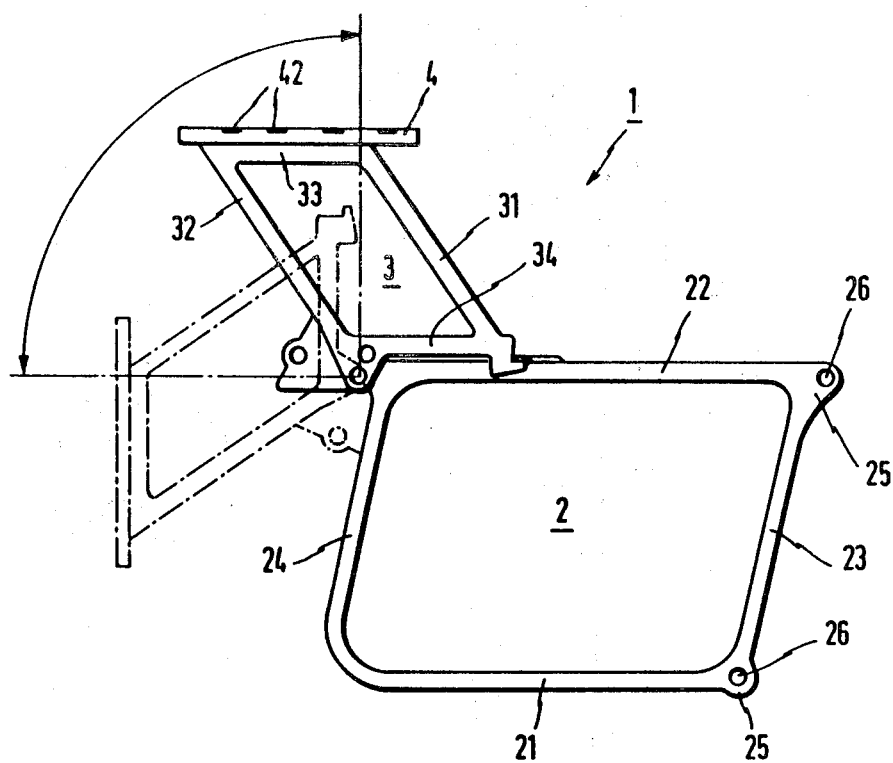
FIG. 2 is a schematic side view of the holding device of FIG. 1, illustrating in dash-and-dot lines the downwardly tilted position of the upper frames with the supported baggage frames.

The lateral frames 2, as seen from FIGS. 1 and 2, have substantially the form of a parallelogram constituted by horizontal lower and upper sides 21 and 22 and slanted lateral sides 23 and 24. The angle of inclination of the lateral sides is in the range of about 10° to the vertical. Front corners 25 are rounded and provided with bolts 26 through which the holding device is connected to the motorcycle. The horizontal sides 21 and 22 as well as the slightly inclined rear side 24 of each holding frame 2 has a cross section resembling the shape of a double T, whereas the slightly inclined front side 23 has a single T-shaped cross section. The upper rear corner of each holding frame 2 is extended rearwardly (FIG. 3) and is formed with guiding grooves 6 and 7. A part of the top side 22 of the holding frame 2 is formed near its rear end with a receiving region 221 for the upper frame 3, as will be explained in more detail below.

The upper frames 3, as will be seen particularly from FIG. 2, have also the shape of a parallelogram with substantially horizontal lower and upper sides 33 and 34 and with slanted lateral sides 31 and 32 forming an angle in the range of about 40° with a vertical. The rear end of the lower side 34 of the upper frame 3 is formed with a projection 35 provided with square cut-outs 37 for receiving fastening screws 38, and with a circular bore 36 for mounting a blinker. The front end 341 of the lower side 34 of each frame 3, as will be seen from FIG. 3, is bent downwardly and provided with a forwardly projecting extension 342.

The baggage rack 4 has a rectangular shape and is formed with a plurality of cut-outs 41. In addition, lateral side walls of the rack 4 are formed with a series of slot-like recesses 42 into which rectangular safety nuts are insertable. The slots 42 are in alignment with openings 39 in the upper side 33 of each upper frame 3, through which attachment screws are guided for engagement with the safety nuts. Preferably, the lateral side walls of the rack 4 exceed in length the upper side of the frames 3 and also the number of lateral slots 42 exceeds the number of guiding holes 39 in the upper frames 3 so that the horizontal position of the baggage rack relative to the supporting frame 3 can be longitudinally adjusted. In this manner, the baggage rack can be accommodated within certain limits to the rear part of the motorcycle.

FIG. 1 also illustrates a safety member 5 which is connected by a synthetic fiber 51. The safety member 5 has a resilient clip which is insertable into a bore 52 formed in an upright projection from the upper surface of the top side 22 of the frame 2. In order to safeguard a fixed position of the upper frame 3 relative to the lower holding frame 2, the safety member 5 engages the lower side 34 of the upper frame 3 and the upper side 22 of the lower holding frame 2 and itself is held in fixed position by the resilient force of its clip engaging the aforementioned bore 52. In this manner, an unintended displacement of the frames and accidental tilting of the baggage rack 4 is prevented.

Figure 3:
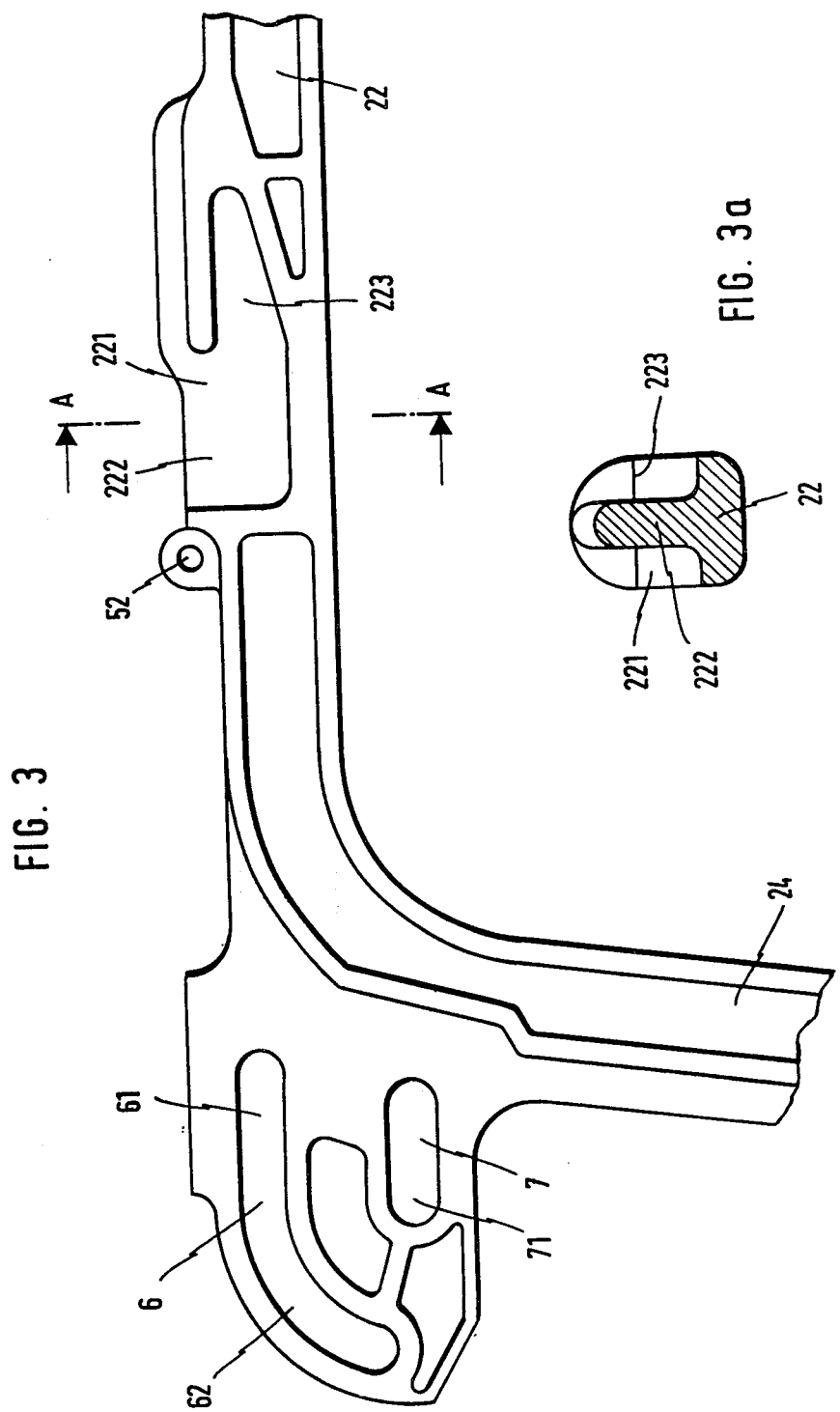
FIG. 3 is a side view of a cut-away part, shown on an enlarged scale, of the top and rear sides of the lateral holding frame for supporting a saddle bag in the device according to FIG. 1.

The guiding means 6 and 7 for the fastening screws of the upper frames 3 are illustrated in greater detail in FIG. 3. In this embodiment, the rear end of the top side 22 of the holding frame 2 is extended rearwardly and formed with a downwards curved guiding groove 6 and a shorter straight guiding groove 7. The upper guiding groove 6 has a straight portion 61 directed substantially parallel to the upper side 22, and this straight portion transitions into a curved part 62 in the form of a quadrant. The length of the lower guiding groove 7 corresponds in length and orientation to the straight part 61 in the upper groove. The ends of respective guiding grooves are rounded and the rear end of lower groove 7 constitutes a pivot point 71 around which the upper frames 3 with the bridging baggage rack are tilted. The length of the lower guiding groove 7 is dimensioned such that the aforementioned conical projection 342 at the leading end of the lower side 34 of frame 3 can be fully disengaged from the matching receptacle 233 formed in the lateral surface of the upper side 22 of holding frame 2. Upon disengaging the projecting nose 342 from the recess 233, the upper frames 3 can be tilted about the pivot point 71 and the nose 342 can pass through the open passage 222 in the receiving region 221.

It will be seen particularly from FIG. 3a that the cross section of the upper side 22 in the receiving region 221 is formed with a central upwardly projecting part 222 which matches a corresponding central recess in the lower surface 223 in the upper frame 3. The bore 52 is also formed in a central projection adjoining the rear part of the receiving region 222 and, as mentioned before, it holds the resilient clip of the safety member 51 which is secured to the side 22 by a plastic fiber.

Figure 4:
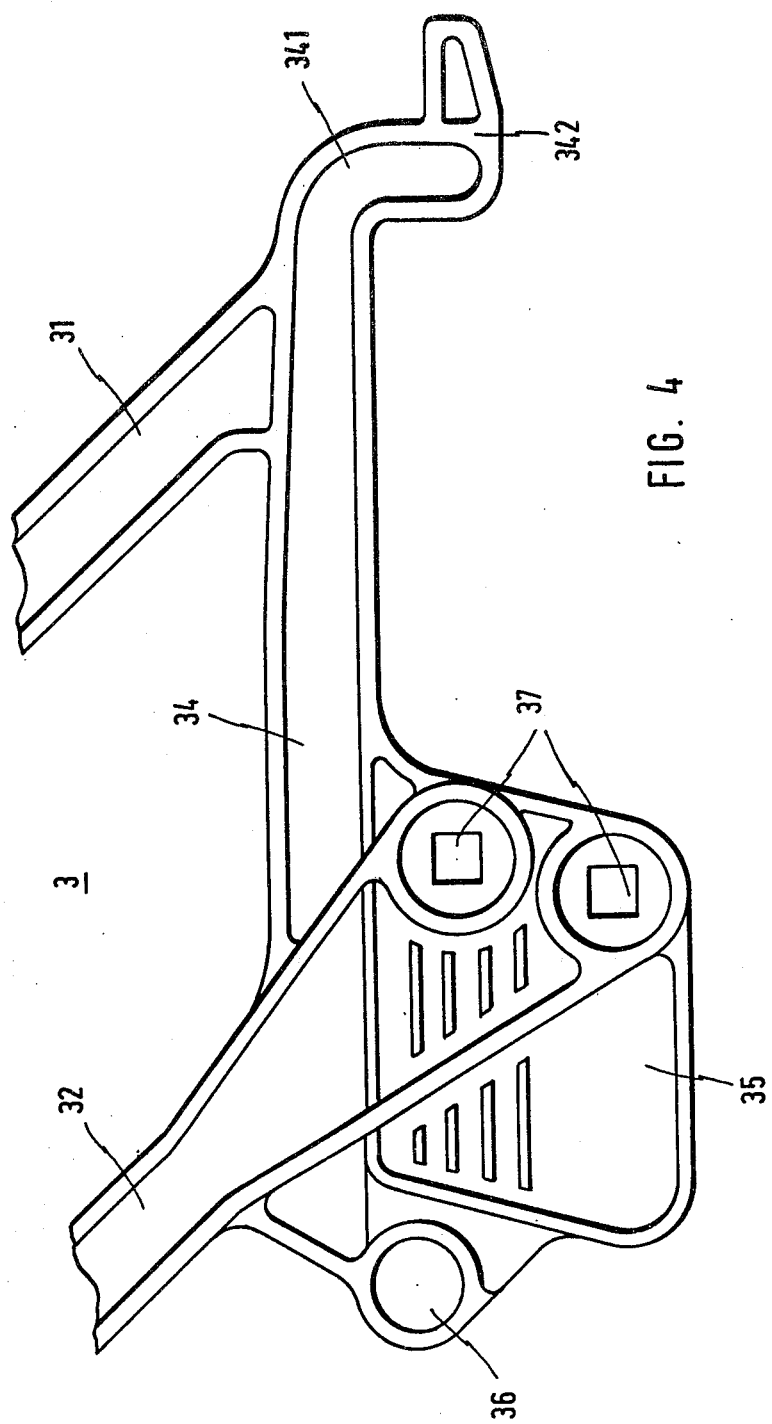
FIG. 4 is a side view, shown on an enlarged scale, of the lower side of the upper frame of the device according to FIG. 1.

FIG. 4 shows on an enlarged scale the lower side 34 of the upper frame 3. The front end 341 of the side 34 is bent downwardly and provided with the aforementioned conical nose 342 which in engagement with the matching conical recess 223 in the top side 22 locks the frames 3 against tilting. The rear end of the lower side 34 is formed with the downwardly directed attachment 35, the lower surface of which serves as an abutment surface engageable with a lateral side 24 when the upper frames 3 and the rack 4 are tilted into their lower position. The attachment 35 is also provided with a bore 36 to which a blinker or a reflector is attached by a fastening screw. Near a lateral side opposite the bore 36 there are provided two square holes 37 through which the fastening screws 38 are guided to project into the guiding grooves 6 and 7. These screws serve thus both for guiding the upper frame 3 relative to the lower frames 2 and for securing the two frames to each other.

FIG. 2 illustrates in full lines the upper frame 3 with the baggage rack 4 in its operative swung-up position. In dash-dot lines the frame 3 and the rack 4 are shown in their tilted position, in which the frame is rotated about pivot point 71 about 90° and the projection or attachment 35 abuts against the rear lateral side 24 of the lower frame 2. When the frame 3 is returned in its swung-up position illustrated in FIG. 1, the conical nose 342 on the lower side 34 of frame 3 enters the recessed receiving region 212 is flush with the recessed socket 223 in the top side of frame 2 (FIG. 3). Thereupon, the upper frames 3 with the rack 4 are shifted forwardly until the nose 342 fully engages the recessed socket 223 and after tightening the screws 38 and the insertion of the safety member 5, the frames and the rack are securely fixed in their position. Due to the conical configuration of the recess socket 223 and the nose 342, slight manufacturing tolerances or wear are compensated. As explained before, safety resilient clip 5 upon engaging the bore 52 safeguards the frames in their swung-up position even if the screws 38 are insufficiently tightened.

If an operator of the motorcycle provided with the holding means according to this invention wants to swing open the seat, he needs only to loosen the four locking screws 38. Then the frames 3 with the rack are shifted rearwards in the guiding grooves 6 and 7 until the locking nose 342 disengages the socket 223 and is free to move upwards through the open region 221.

When tilting the frames 3 about the lower screws 38 in pivot point 71, the upper screws 38 slide in the curved part of the groove 6 into abutment with the rounded end of the groove. Upon swinging the seat of the motorcycle into its normal position, the same process is repeated in reversed order.

Figure 5:
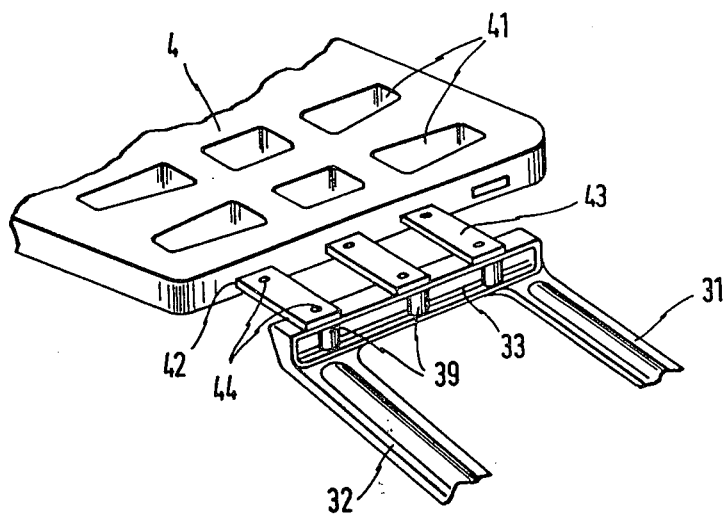
FIG. 5 is a perspective view of a cut-away part of the baggage rack of FIG. 1 shown with extension plates.

FIG. 5 shows schematically a part of the baggage rack 4 and the upper part of the upper frame 3 with lateral sides 31 and 32 and the top side 33. In this embodiment, the elongated openings or slots 42 in the circumferential wall of the rack 4 receive the ends of elongated plates 43. The major surfaces of the plates 43 are provided with two threaded holes 34. In order to accommodate the rack 4 on a motorcycle having a particularly wide construction of its rear part, the plates 43 are insertable into the slots 42 to a desired depth and secured to the rack by non-illustrated screws engaging the corresponding threaded hole 44. The other end of the extension plates 43 is secured to the upper side 33 by means of screws passing through cylindrical spaces 39 and engaging the corresponding threaded holes 44. As described before, by means of such extension plates the holding device according to this invention can be adjusted to different widths of the motorcycle in the range from 34 cm to 41 cm for example.

It will be understood that each of the elements described above, or two or more together, may also find a useful application in other types of constructions differing from the types described above.

While the invention has been illustrated and described as embodied in specific examples of the holding device for use with a motorcycle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for use with a motorcycle to support saddlebags, baggage pieces, blinkers, reflectors, and the like, comprising two lateral holding frames, each defining a top side and a rear side; two upper frames each being attached by transverse fastening screws to the top side of an assigned holding frame in such a manner that after loosening said fastening screws said upper frames being displaceable backwards when viewed in the driving direction; a transverse rack mounted on said upper frames; an end part of each top side of the holding frame adjoining the rear side thereof being provided with guiding means in the form of two grooves formed in the lateral wall of said top side for slidable engaging the loosened fastening screws, each of said grooves having a straight portion for guiding said screws and thus said upper frames in horizontal direction, and a bent-portion for tilting said upper frames about 90° downwardly.

2. A holding device as defined in claim 1 wherein said holding and upper frames are made of a strong, fracture resistant synthetic material.

3. A holding device as defined in claim 1, wherein the upper guiding groove has a leading portion extending in direction of the top side of the holding frame and a trailing portion curved according to a quarant whereas the lower guiding groove is spaced apart from and extending parallel to the leading part of the upper guiding groove, whereby the rear part of the lower guiding groove acts as a pivot point for the upper frames.

4. A holding device as defined in claim 1, wherein each of said upper frames has a lower side provided at its front end with a downwardly directed extension formed with a forwardly directed locking nose of a conical configuration, and wherein the top side of the underlying holding frame in the range of said downward extension is formed with a laterally recessed region defining a forwardly directed recessed socket for guiding and receiving the locking nose of the upper frame to hold the same in its normal position in connection with the holding frame.

5. A holding device as defined in claim 4, wherein said recessed receiving region is formed on both lateral walls of said top side and said projecting locking nose on said upper frame has a central slot matching the thickness of said top side between said recessed regions.

6. A holding device as defined in claim 2, wherein the synthetic material of said frames is polyamide 6 reinforced with 30-33% of glass fibers.

7. A holding device as defined in claim 2, wherein said transverse rack has a circumferential wall provided at two opposite sides thereof with a series of slots, the top side of said upper frames being provided with transversely directed adjustment plates each having a free end insertable into an assigned slot in the rack and means for securing said transverse plates to the rack in the adjusted transverse position of the lateral holding frames.

8. A holding device for use with a motorcycle to support saddlebags, baggage pieces, blinkers, reflectors, and the like, comprising two lateral holding frames, each defining a top side and a rear side; two upper frames each being attached by transverse fastening screws to the top side of an assigned holding frame; a transverse rack mounted on said upper frames; said holding and upper frames being made of a strong, fracture-resistant synthetic material, an end part of each top side of the holding frame adjoining the rear side thereof being provided with guiding means designed such that upon loosening the fastening screws said upper frames being displacable in two opposite directions along said top side and tiltable together with the transverse rack about 90° downwardly, and further including a detachable safety member made of an elastic material, said top side of the holding frame being formed with an upwardly directed extension with a bore for receiving the safety member, said bore being located above the lowermost part of the lower side of said upper frame so that the member secures the two frames in a fixed position relative to each other even if the fastening screws are loosened.

* * * * *